July 5, 1949.  G. A. LYON  2,474,852
FENDER SKIRT
Filed Oct. 11, 1943  2 Sheets-Sheet 1
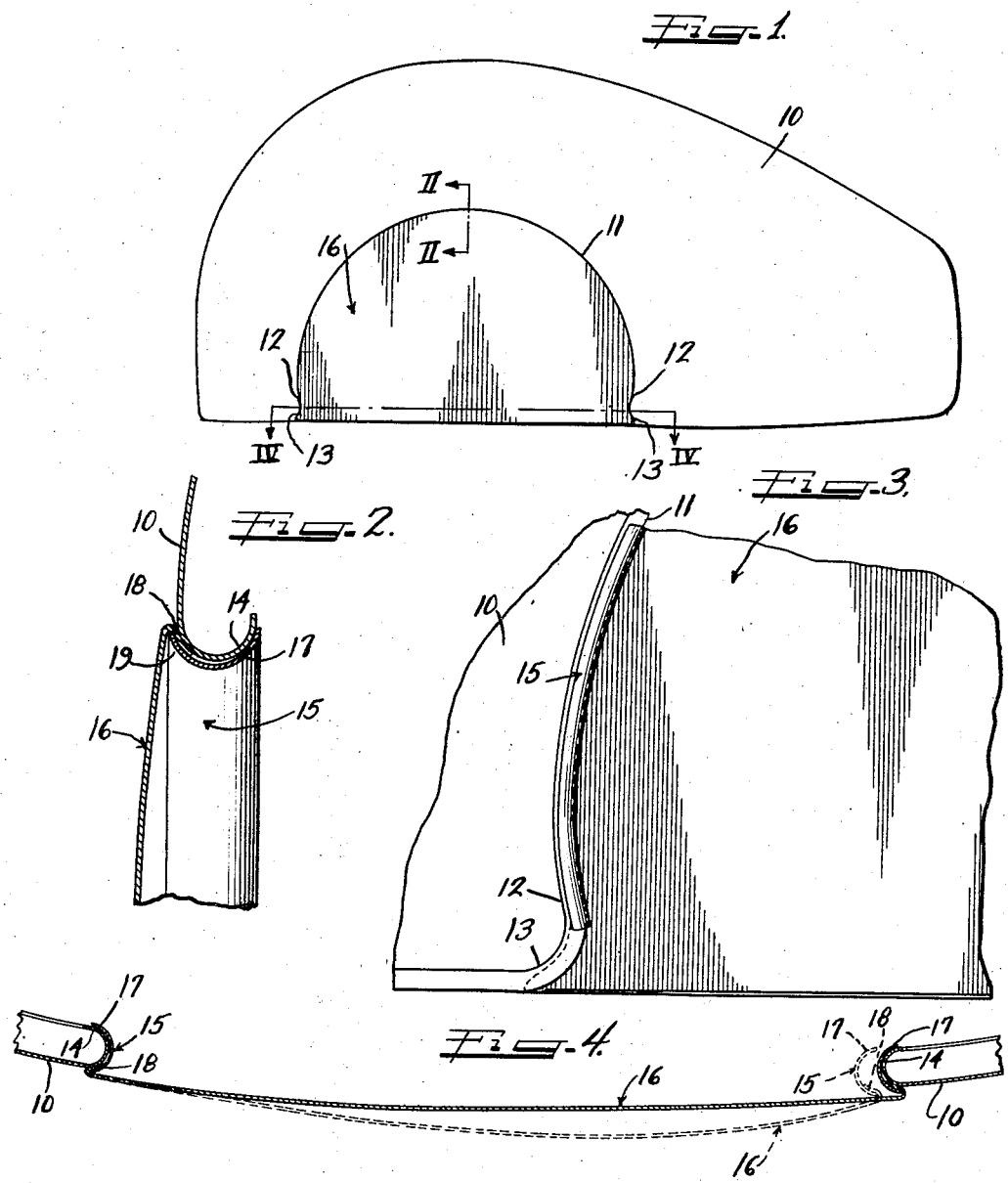
Inventor
GEORGE ALBERT LYON.
by Charles W. Hills
Attys.

July 5, 1949.　　　　　G. A. LYON　　　　　2,474,852
FENDER SKIRT
Filed Oct. 11, 1943　　　　　　　　　　　2 Sheets-Sheet 2
Fig. 5.
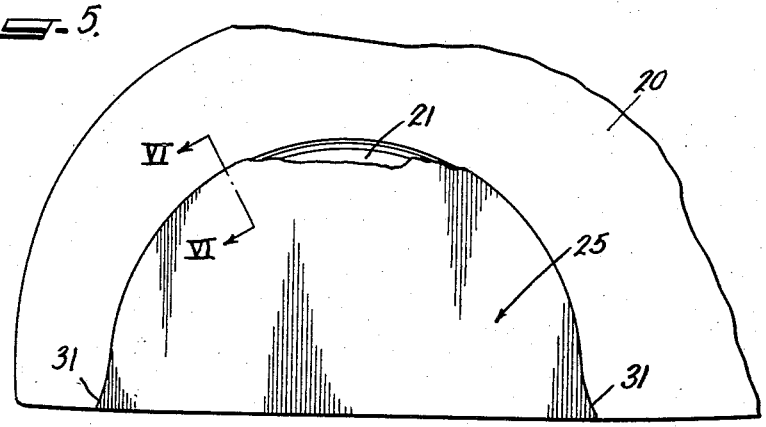
Fig. 8.　　　Fig. 7.　　　Fig. 6.
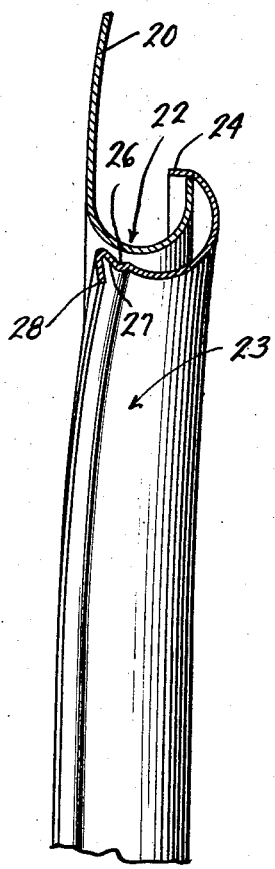 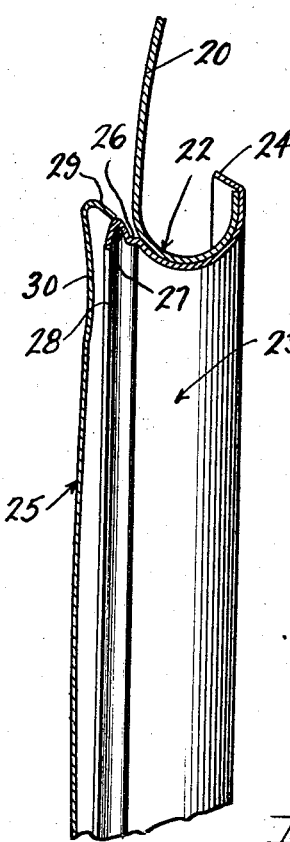 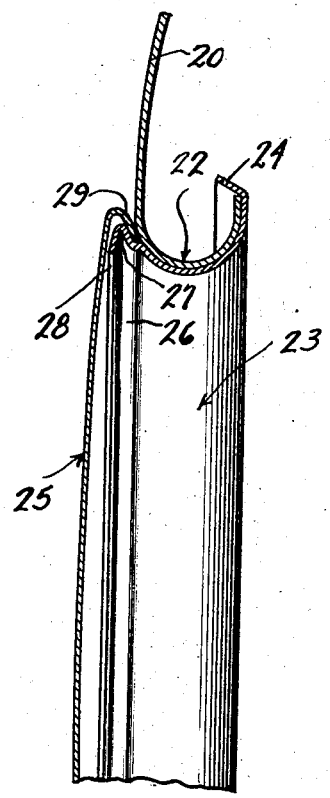
Inventor
GEORGE ALBERT LYON.
by Charles W. Hills Attys.

Patented July 5, 1949

2,474,852

UNITED STATES PATENT OFFICE 2,474,852

FENDER SKIRT

George Albert Lyon, Allenhurst, N. J., assignor to Lyon, Incorporated, Detroit, Mich., a corporation of Delaware Application October 11, 1943, Serial No. 505,784

7 Claims. (Cl. 280—153)

This invention is directed to an improved fender skirt for automotive vehicles or the like.

It is an important object of the invention to provide for an automotive vehicle or the like an improved fender skirt constructed and arranged to efficiently withstand breakage when subjected to abutment or collision with other objects.

It is another important object of the invention to provide an improved fender skirt which may be quickly and easily attached and detached from a fender with which it is associated to afford servicing of a wheel covered thereby.

It is a further object of the invention to provide for an automotive vehicle or the like an improved fender skirt which is so constructed and arranged that it materially reduces the sprung weight of the vehicle, thus considerably contributing to reduction in weight of the entire vehicle body.

It is a further object of the invention to provide an improved fender skirt structure constructed from a material which is self-supporting as to form and yet temporarily flexible, such material being in the nature of resilient sheet synthetic plastic material or the like.

It is another important object of the invention to provide for an improved fender skirt construction a novel and improved assembly for detachably securing the skirt to a fender in such a way that it may be readily removed therefrom and yet securely maintained thereon during use.

In accordance with the general features of the invention, there is provided herein, for a fender having a wheel opening therein, said opening being defined by an inwardly turned flange on the fender, an improved skirt assembly which includes a relatively rigid yet resiliently flexible attachment element arranged for retaining engagement with the flange on the fender and further arranged to retainingly receive the edge portion of a fender skirt formed from synthetic plastic sheet material, said fender skirt being arranged to span the opening to conceal a wheel covered by the fender and further being arranged so that it may flex resiliently inwardly upon engagement thereof by an object pressed thereagainst and so as to immediately flex into normal configuration when the pressure of such object thereagainst is relieved.

Another feature of the invention resides in the fact that a fender skirt constructed from sheet synthetic plastic material is susceptible of being constructed throughout the thickness thereof in any desired color or hue to match the color scheme of the vehicle with which it is associated, thereby avoiding the necessity of applying a coat of enamel thereto which will be scratched off to mar the appearance of the vehicle upon collision of the vulnerable parts thereof, namely the fender skirts.

Many other objects and advantages of the invention will be apparent from the following description and accompanying drawings in which:

Figure 1 is a side elevational view of a fender incorporating the fender skirt of my invention;

Figure 2 is a cross-sectional view taken on the line II—II of Figure 1;

Figure 3 is an enlarged fragmentary rear or inside elevational view of my improved fender skirt construction;

Figure 4 is a cross-sectional view taken on the line IV—IV of Figure 1;

Figure 5 is a fragmentary side elevational view taken from the outside of a modified form of my invention;

Figure 6 is a cross-sectional view taken on the line VI—VI of Figure 5;

Figure 7 is a fragmentary cross-sectional view similar to Figure 6 but showing a retaining element secured to the fender with the fender skirt partially applied thereto; and Figure 8 is a cross-sectional view similar to Figures 6 and 7 but showing the retaining element partially secured to the fender.

As best shown in Figures 1 and 3 the fender 10 is provided in the side wall thereof with a wheel opening 11 which is arranged for alignment with the respective wheel of the vehicle and is representative of slightly more than half of a complete circle so that the lower portions thereof curve convergingly toward one another as at 12 to retain the skirt assembly wedgedly within the fender against dropping therefrom by gravity. The extreme edges of the portion of the fender defining the wheel opening below the curved portions 12 diverge as at 13 to facilitate insertion of the skirt assembly therein.

As will best be seen from Figures 2, 3 and 4, the edge portion of the fender which defines the wheel opening 11 is bent inwardly to form a curvate flange 14 which bulges into the wheel opening. When the skirt assembly is associated with the fender it will be seen that a retaining member 15 of concavo-convex configuration substantially complementary to the flange 14 is retainingly engaged by the flange 14. This retaining engagement is attained by interlocking relationship existing between the inner peripheral portion 17 of the retaining member 15 and the inner peripheral portion of the flange 14 of the fender 10.

As will best be seen from Figure 2, the sheet plastic fender shield skirt 16 is provided with a general configuration to conform with the wheel opening 11 and is further provided at the curvate peripheral part thereof with an inwardly turned hook-like flange 18 which may be flexed over the outer peripheral part 19 of the retaining member 15. It will thus be seen that when in assembled relationship, the retaining strip will substantially envelop the curvate flange 14 of the fender 10 and be held in position by the convergingly related portions 12 at the lower part of the wheel opening 11 in the fender. This relationship of the retaining member 15 and the fender 10 will be seen clearly from the fragmentary view of Figure 3.

It is contemplated that ordinarily the retaining member 15 will be permanently attached to the fender 10 and that attachment and detachment of the skirt 16 will be accomplished by slightly flexing one end of the retaining member 15 away from the fender opening flange 14 as shown at the right-hand of Figure 4 to permit the skirt 16 and particularly the flange 18 thereof to be flexed away from and over the edge 19 thereof, whereupon the remainder of the flange 18 may be progressively slipped from the retaining member 15 to complete removal of the skirt from the fender.

In initially assembling the arrangement shown in Figures 1, 2, 3, and 4, it will be seen that it is merely necessary for the operator to flex the extreme ends of the retaining member 15 generally toward one another sufficiently to permit insertion of the flange 18 of the skirt 16 thereover, whereupon the skirt and the retaining member are adapted to be assembled and the skirt may then be flexed outwardly as shown in dotted lines in Figure 4 to draw the flange 18 into engagement with and hold it assembled with the retaining member and permit insertion of the assembled parts upwardly to a position beyond the inwardly converging portions 12 of the fender. Thereafter, when the flexed parts are released, they will spring back into pressure engagement all around the defining edge of the aperture 11 and be securely retained in operative position.

With the foregoing construction it will be seen that there is provided at a vulnerable portion of the vehicle a readily flexible, yet form sustaining, self-supporting area which will readily withstand collision and may be flexibly distorted inwardly thereby but will immediately and easily flex, by virtue of its own resiliency, outwardly into normal position after the distorting pressures are relieved therefrom. Furthermore, it will be seen that this portion of the vehicle which is normally subjected to considerable abrasion and scratching will remain free from serious damage thereby because it is formed from a plastic material which needs no surface coating such as required by an ordinary steel skirt provided with the usual enamel coating, whereby the scratches will develop rust spots to cause progressive deterioration of the ornamental coating.

Furthermore, it will be seen that there is provided herein a novel and efficient manner of detachably securing a fender skirt assembly to the fender to permit ready removal of the skirt from the fender for servicing the wheel concealed thereby.

It will be understood, of course, that in attaching and detaching the skirt assembly from the fender the operator may, if desired, utilize the retaining member 15 and the skirt 16 as a unit and accomplish the detachment operation by removing from the fender, in one operation, both the skirt 16 and the retaining member 15 by reversal of the process as is explained above in connection with the initial operation of the attachment of the parts shown.

In the modified form of my invention shown in Figures 5, 6, 7 and 8, the fender 20 is provided with a wheel opening 21 which is also of semicircular form but, in this instance, because of the construction of the fender skirt assembly it will be seen that the lower portions of the fender in the vicinity of the opening 21 need not converge as in the above described form.

As best shown in Figure 6, the fender 20 is here also provided with an inwardly and upwardly turned curvate flange 22 which defines the edge of the wheel opening 21. The retaining member associated therewith, as shown at 23, includes an inner marginal portion 24 which, as shown in Figure 8, is arranged to be slipped over the edge of the flange 22 on the fender 20 and then, as shown in Figure 7, bent thereover to form a permanent interlocking engagement between the retaining member 23 and the fender 20 in that it will be left on the fender when the skirt is removed. The intermediate cross-sectional portion of the retaining member 23 is of concavo-convex configuration substantially to conform to the cross-sectional configuration of the flange 22, whereby the parts become essentially a unitary structure, which, as described presently, is arranged to efficiently receive a fender skirt 25 in detachable engagement.

To this end the outer margin of the retaining member 23 is formed with an offset 26 which provides a flange 27 that is spaced outwardly from the adjacent portion of the outer surface of the fender 20 when the retaining member 23 is in its ultimate position as shown in Figure 7. The extreme outer marginal portion of the retaining member 23 is then preferably bent radially inwardly to form a flange 28 so that a rounded corner is provided for attachment and detachment of the fender skirt thereover as to be explained presently.

The fender skirt 25 which is formed from self-supporting, form retaining, yet resiliently flexible sheet synthetic plastic material or the like is provided with a configuration similar to the wheel opening 21 and is provided at the curvate edge thereof with an axially and radially inwardly extending flange 29 which is arranged to be deflected over the rounded corner between the flanges 26 and 28 of the retaining member to provide secure retained engagement between the fender assembly and the skirt. As will best be seen from Figure 7, the flange 29, which normally assumes a flexed position as shown in Figure 6 in which it seats in the recess between the flange 27 of the retaining member and the adjacent portion of the outer surface of the fender 20, may be distorted by depressing the skirt as at 30 in Figure 7 and pulling the flange slightly outwardly to raise the edge thereof, whereupon it may be forced over the rounded edge between the flanges 27 and 28 of the retaining member and into seated engagement in the space provided by the flange 26 and the adjacent portion of the surface of the fender 20 (see Figure 6).

In the initial assembly of the retaining member 23 with the fender 20, as will be seen from Figure 8, the retaining member may be flexed sufficiently to insert it in a concentric position relative to the edge of the wheel opening 21 in the fender 20, whereupon it may be released and thereafter the flange 24 thereof formed to provide the permanent interlocking relationship described previously.

From the foregoing it will be seen that in the construction of Figures 5, 6, 7 and 8, the retaining member 23 and the fender 20 are secured together permanently and tightly so that vibration and rattle will not develop therebetween and that the resilient, sheet plastic fender skirt may be quickly and easily attached to or detached from the vehicle. With such a construction it will be seen that development of rattle between the relatively movable parts, that is the fender assembly and the fender skirt, will not take place since one of the movable parts is formed from relatively resilient, cushion-like plastic material.

It will be seen that in the construction shown in Figures 5 to 8, it is not necessary that the wheel opening in the fender 20 be of such size that the extreme lower, opening defining edges of the fender will be converged toward one another since the maintenance of the retaining member 23 upon the fender is accomplished by the interlocking relationship of the flange 22 of the fender and the flange 24 of the retaining member. If desired, however, the wheel opening 21 may be defined at the lower part thereof by slightly divergently flared terminal portions 31 which may be utilized in properly aligning the retaining member 23 upon its attachment to the fender and which further imparts a graceful, attractive appearance to the fender assembly.

As indicated previously, there are many advantages attendant upon the fender skirt construction shown herein. The skirt, which is one of the vulnerable portions of the vehicle with regard to sideswiping, is readily distortible under collision pressures to immediately snap back into initial position when these pressures are relieved. The fender skirt, being constructed from sheet synthetic plastic or the like, is susceptible of having color imparted thereto throughout the depth thereof rather than by a surface coating, whereby scratching does not seriously mar the desired ornamental effect. The fender skirt is readily removable from the fender for servicing of the wheel, particularly in view of the fact that in a construction made in accordance with my invention, the skirt will not "freeze" to the fender by virtue of the formation of rust or the like.

From the foregoing it will also be seen that there is provided herein new and novel retaining means for detachably maintaining the fender skirt upon the fender. Preferably, as indicated previously, the retaining means which comprises an elongated strip, is resilient whereby it may be distorted from its initial configuration to be interfitted with the fender skirt. With such a construction it will be seen that the retaining means and the skirt will thus, after the retaining means has flexed back to its initial position, be engaged upon the fender under stress developed by the resiliency thereof when the distorting pressures are relieved therefrom.

What I claim is:

1. In a fender assembly, a fender, said fender having a marginal part formed to provide an inwardly extending flange, said margin being formed to define a wheel opening in the fender, a fender skirt formed from form retaining, self-supporting, resiliently flexible material such as sheet synthetic plastic, and retaining means for securing said skirt to said fender, said retaining means including a longitudinal portion formed to permanently interlock with said flange on the fender and including a longitudinal portion arranged to engage against said flange and extend generally outwardly relative thereto, said generally outwardly extending portion being provided with an offset to afford a groove between the inner surface of said retaining member and the adjacent portion of the outer surface of the fender, and a generally inwardly extending flange on said fender skirt for detachably engaging in said groove, whereby said skirt is removably retained on said fender.

2. In a fender assembly, a fender, said fender having a marginal part formed to provide an inwardly extending flange, said margin being formed to define a wheel opening in the fender, a fender skirt formed from form retaining, self-supporting, resiliently flexible material such as sheet synthetic plastic, and retaining means for securing said skirt to said fender, said retaining means including a longitudinal portion formed to permanently interlock with said flange on the fender and including a longitudinal portion arranged to engage against said flange and extend generally outwardly relative thereto, said generally outwardly extending portion being provided with an offset to afford a groove between the inner surface of said retaining member and the adjacent portion of the outer surface of the fender, and a generally inwardly extending flange on said fender skirt for detachably engaging in said groove, whereby said skirt is removably retained on said fender, said retaining means being formed to be distorted, with said fender skirt thereby to enable the same to be retainingly engaged with the flange on said fender to provide for detachable engagement between the fender skirt and the fender.

3. A fender construction for a vehicle wheel including a fender having an opening opposite the side of the wheel comprising a resiliently flexible plastic fender skirt of a configuration to fit in said opening, said skirt being provided with a marginal portion which is elastically flexible with respect to the edge of the opening for retaining the skirt on the fender, and an intermediate retaining member for disposition between the edge of the opening and the flexible margin of the skirt adapted to be resiliently snapped into retaining engagement with the edge of the fender opening and to cooperate in the retention of the margin of the skirt at said fender edge, said flexible margin being manually resiliently deflectable transversely for assembling it with the retaining member and being returnable back of its own accord to its original shape upon release from deflection.

4. In a fender and fender skirt assembly of the character described, a fender having a wheel access opening therein, a fender shield for closing said opening formed from sheet plastic material characterized by being resiliently deflectable and form retaining so that after flexing pressure is removed therefrom it automatically returns of its own accord to its original shape, said fender skirt having a return bent flange along its fender-engaging margin, and a retaining member engaging the margin of the fender about said opening and being interlockingly engaged by said fender skirt marginal flange, said flange being manually resiliently deflectable into and out of said interlocking engagement with said retaining member.

5. A fender skirt assembly comprising, in combination, a panel formed from thin, light weight form retaining, self-sustaining, resiliently flexible material marginally shaped to fit within and close a wheel opening in a fender wherein the wheel opening is defined at the lower portions of its ends by generally convergent fender skirt retaining protrusions, a channel shaped retaining strip internestingly engageable with the edge defining the wheel opening and of a length to extend from one of the convergent fender skirt retaining protrusions continuously in engagement with the fender opening edge to the other of said protrusions and being resiliently expansible so as to tend at all times to maintain a tensioned engagement with the fender opening edge, the fender skirt having a marginal inturned hook-like flange in interhooked relation with the outer edge of said retaining strip, the fender skirt panel being flexibly distortable normal to its plane in response to pressure applied to the respective ends thereof for drawing said retaining strip into a compressed condition sufficient to clear said protrusions when mounting the fender skirt assembly in the wheel opening, and then resiliently returning to the normal plane of the fender skirt panel to permit expansion of the retaining strip into fender edge retaining engagement above said protrusions.

6. In a fender skirt assembly, a light weight panel formed from form retaining, self-supporting, resiliently flexible sheet material and dimensioned to fit in closing relation to a wheel opening in a fender, the fender margin opposing edge of the fender skirt having an inturned hook-like flange formation resiliently flexibly manipulable to bend normal to its plane, and a retaining strip of generally channel shaped cross section and formed from substantially stiffer material than the fender skirt panel and with the channel thereof opening in a direction to engage nestingly with the edge defining the wheel opening, and said hook-like flange being detachably interengaged with the outer margin of said strip by flexible bending of said flange to clear said outer strip margin into and out of interhooked relationship with said margin.

7. A fender skirt for disposition in closing relation to the wheel opening in a fender, comprising, in combination, a fender shield panel formed from resiliently deflectable and form-retaining material, said panel having a return bent flange along its fender-engaging margin, and a retaining member engageable with the margin of the fender about said opening and being interlockingly engaged by said panel flange, said flange being manually resiliently deflectable into and out of said interlocking engagement with said retaining member.

GEORGE ALBERT LYON.

REFERENCES CITED

The following references are of record in the file of this patent:

UNITED STATES PATENTS

| Number | Name | Date |
| --- | --- | --- |
| 1,494,179 | Matthew | May 13, 1924 |
| 2,118,624 | Schatzman | May 24, 1938 |
| 2,124,041 | Schatzman | July 19, 1938 |
| 2,167,376 | Schulz | July 25, 1939 |
| 2,222,624 | Mills | Nov. 26, 1940 |
| 2,344,092 | Komenda | Mar. 14, 1944 |
| 2,421,634 | Lyon | June 3, 1947 |

FOREIGN PATENTS

| Number | Country | Date |
| --- | --- | --- |
| 103,092 | Australia | May 11, 1937 |